US012689598B2

(12) United States Patent
Thirumurthi et al.

(10) Patent No.: US 12,689,598 B2
(45) Date of Patent: \*Jul. 21, 2026

(54) ADJUSTABLE BIT MASK FOR HIGH-SPEED NATIVE LOAD BALANCING ON A SWITCH

(71) Applicant: Cisco Technology, Inc., San Jose, CA (US)

(72) Inventors: Rajendra Kumar Thirumurthi, Cupertino, CA (US); Samar Sharma, San Jose, CA (US); Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/757,466

(22) Filed: Jun. 27, 2024

(65) Prior Publication Data

US 2024/0356869 A1 Oct. 24, 2024

Related U.S. Application Data

(63) Continuation of application No. 17/862,043, filed on Jul. 11, 2022, now Pat. No. 12,107,776, which is a continuation of application No. 16/420,009, filed on May 22, 2019, now Pat. No. 11,388,113, which is a continuation of application No. 14/715,339, filed on May 18, 2015, now Pat. No. 10,305,816.

(60) Provisional application No. 62/141,158, filed on Mar. 31, 2015.

(51) Int. Cl.
| | |
|---|---|
| *H04L 49/50* | (2022.01) |
| *H04L 45/74* | (2022.01) |
| *H04L 47/125* | (2022.01) |
| *H04L 47/726* | (2022.01) |

(52) U.S. Cl.
CPC ............ *H04L 49/50* (2013.01); *H04L 47/125* (2013.01); *H04L 47/726* (2013.01); *H04L 45/74* (2013.01)

(58) Field of Classification Search
CPC ..... H04L 45/74; H04L 47/125; H04L 47/726; H04L 49/50
USPC ........................................................ 709/226
See application file for complete search history.

(56) References Cited

U.S. PATENT DOCUMENTS

| | | | |
|---|---|---|---|
| 6,763,023 B1 | 7/2004 | Gleeson et al. |
| 6,779,039 B1 | 8/2004 | Bommareddy et al. |
| 6,804,233 B1 | 10/2004 | Congdon et al. |

(Continued)

OTHER PUBLICATIONS

Microsoft Computer Dictionary 62 (5th ed. 2002) (Year: 2002).*

(Continued)

*Primary Examiner* — David P Zarka
(74) *Attorney, Agent, or Firm* — Polsinelli P.C.

(57) ABSTRACT

In an example, a network switch is configured to natively act as a high-speed load balancer. Numerous load-balancing techniques may be used, including one that bases the traffic "bucket" on a source IP address of an incoming packet. This particular technique provides a network administrator a powerful tool for shaping network traffic. For example, by assigning certain classes of computers on the network particular IP addresses, the network administrator can ensure that the traffic is load balanced in a desirable fashion. To further increase flexibility, the network administrator may apply a bit mask to the IP address, and expose only a portion, selected from a desired octet of the address.

20 Claims, 10 Drawing Sheets

(56) References Cited

U.S. PATENT DOCUMENTS

| | | | |
|---|---|---|---|
| 7,027,465 B2 * | 4/2006 | Hautala | H04L 69/22 |
| | | | 370/506 |
| 7,062,571 B1 * | 6/2006 | Dale | H04L 69/12 |
| | | | 709/239 |
| 7,379,979 B2 | 5/2008 | Huo et al. | |
| 7,522,603 B2 | 4/2009 | Vasseur | |
| 7,542,423 B1 | 6/2009 | Morishige et al. | |
| 7,613,189 B1 | 11/2009 | Kopelman et al. | |
| 7,623,455 B2 | 11/2009 | Hilla et al. | |
| 7,852,774 B2 | 12/2010 | Shen et al. | |
| 8,250,502 B2 | 8/2012 | Wakabayashi | |
| 8,483,096 B2 | 7/2013 | Vahdat et al. | |
| 8,553,552 B2 | 10/2013 | Hu et al. | |
| 8,601,084 B2 | 12/2013 | Carlander | |
| 8,645,508 B1 | 2/2014 | Dickinson et al. | |
| 8,868,726 B1 | 10/2014 | Tu et al. | |
| 8,937,942 B1 | 1/2015 | Li et al. | |
| 8,949,471 B2 | 2/2015 | Hall et al. | |
| 9,203,703 B2 | 12/2015 | Koponen et al. | |
| 9,253,245 B2 | 2/2016 | Wood et al. | |
| 9,270,639 B2 | 2/2016 | Lopez et al. | |
| 9,325,636 B2 | 4/2016 | Yang et al. | |
| 9,338,131 B2 | 5/2016 | Hirouchi | |
| 9,565,104 B2 | 2/2017 | Zhang et al. | |
| 9,667,566 B2 | 5/2017 | Raza et al. | |
| 9,825,865 B1 | 11/2017 | Sharma et al. | |
| 9,853,903 B1 | 12/2017 | Sharma et al. | |
| 9,930,131 B2 | 3/2018 | Maccarthaigh et al. | |
| 10,091,112 B1 | 10/2018 | Sharma et al. | |
| 10,091,312 B1 | 10/2018 | Khanwalkar et al. | |
| 10,129,179 B2 | 11/2018 | Raza et al. | |
| 10,305,816 B1 | 5/2019 | Thirumurthi et al. | |
| 10,382,534 B1 * | 8/2019 | Sharma | H04L 67/1023 |
| 11,388,113 B2 | 7/2022 | Thirumurthi et al. | |
| 12,107,776 B2 * | 10/2024 | Thirumurthi | H04L 47/125 |
| 2008/0084880 A1 | 4/2008 | Dharwadkar | |
| 2009/0016368 A1 | 1/2009 | Lowekamp | |
| 2009/0135722 A1 | 5/2009 | Boers et al. | |
| 2010/0138551 A1 | 6/2010 | Degaonkar et al. | |
| 2011/0134677 A1 | 6/2011 | Inoue | |
| 2011/0235508 A1 | 9/2011 | Goel et al. | |
| 2011/0261811 A1 | 10/2011 | Battestilli et al. | |
| 2011/0289168 A1 | 11/2011 | Allam et al. | |
| 2012/0163164 A1 | 6/2012 | Terry et al. | |
| 2012/0188891 A1 | 7/2012 | Välimaa et al. | |
| 2012/0210416 A1 | 8/2012 | Mihelich et al. | |
| 2012/0246637 A1 | 9/2012 | Kreeger et al. | |
| 2013/0044636 A1 | 2/2013 | Koponen et al. | |
| 2013/0166775 A1 | 6/2013 | Yang et al. | |
| 2013/0188494 A1 | 7/2013 | Mekkattuparamban et al. | |
| 2013/0272305 A1 | 10/2013 | Lefebvre et al. | |
| 2013/0343408 A1 | 12/2013 | Cook et al. | |
| 2014/0025986 A1 | 1/2014 | Kalyanaraman et al. | |
| 2014/0075540 A1 | 3/2014 | Kudla et al. | |
| 2014/0153310 A1 | 6/2014 | Sekar et al. | |
| 2014/0269718 A1 | 9/2014 | Goyal et al. | |
| 2014/0325615 A1 | 10/2014 | Scahill et al. | |
| 2014/0334321 A1 * | 11/2014 | Sanivsky | H04L 47/2441 |
| | | | 370/252 |
| 2014/0351102 A1 | 11/2014 | Jolliffee et al. | |
| 2015/0081762 A1 * | 3/2015 | Mason | H04L 45/72 |
| | | | 709/203 |
| 2016/0036702 A1 | 2/2016 | Yang | |
| 2016/0050145 A1 * | 2/2016 | Tsirkin | H04L 49/9068 |
| | | | 718/105 |
| 2016/0182379 A1 | 6/2016 | Mehra et al. | |
| 2016/0251607 A1 | 9/2016 | Kloos | |
| 2016/0337244 A1 | 11/2016 | Baveja et al. | |
| 2017/0180274 A1 | 6/2017 | Liu | |
| 2024/0356869 A1 * | 10/2024 | Thirumurthi | H04L 49/50 |

OTHER PUBLICATIONS

"Cisco Nexus 7000 Series NX-OS Unicast Routing Configuration Guide, Release 4.x," Routing Overview, May 20, 2015, 14 pages.
Kumar P., "ITD: Load Balancing, Traffic Steering Clusteringusing Nexus 5k/6k/7k," Sep. 16, 2014, 8 pages.
"Merriam-Websters Collegiate Dictionary", 10th Edition, pp. 710, Published on 1993, 3 Pages.
Microsoft Computer Dictionary, 5th ed, 2002, 3 pages.
Vytla M., et al., "ITD Overview," Cisco, 2010, 68 pages.

* cited by examiner

ROUTING TABLE
400

| TRAFFIC BUCKET | NODE |
|---|---|
| B0 | N0 |
| B1 | N1 |
| B2 | N2 |
| B3 | N3 |
| B4 | N0 |
| B5 | N1 |
| B6 | N2 |
| B7 | N3 |

START — 500

RECEIVE INCOMING TRAFFIC — 510

MATCH DESTINATION IP TO LB VIP — 520

ASSESS WORKLOAD BALANCE — 530

IDENTIFY BEST AVAILABLE NODE — 540

ASSIGN INCOMING TRAFFIC TO BUCKET FOR BEST AVAILABLE NODE — 550

FORWARD INCOMING TRAFFIC TO BEST AVAILABLE NODE — 570

LOG TRANSACTION — 580

590 — END

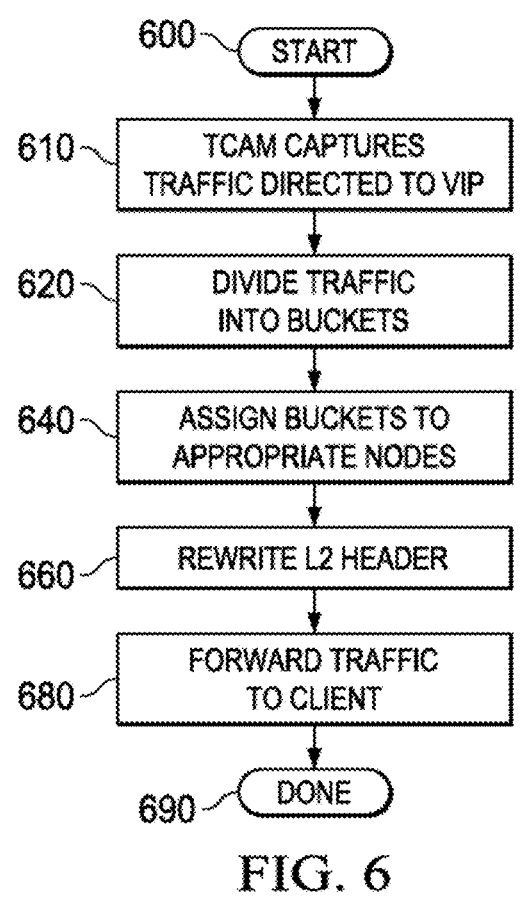

600 — START

610 — TCAM CAPTURES TRAFFIC DIRECTED TO VIP

620 — DIVIDE TRAFFIC INTO BUCKETS

640 — ASSIGN BUCKETS TO APPROPRIATE NODES

660 — REWRITE L2 HEADER

680 — FORWARD TRAFFIC TO CLIENT

690 — DONE

FIG. 6

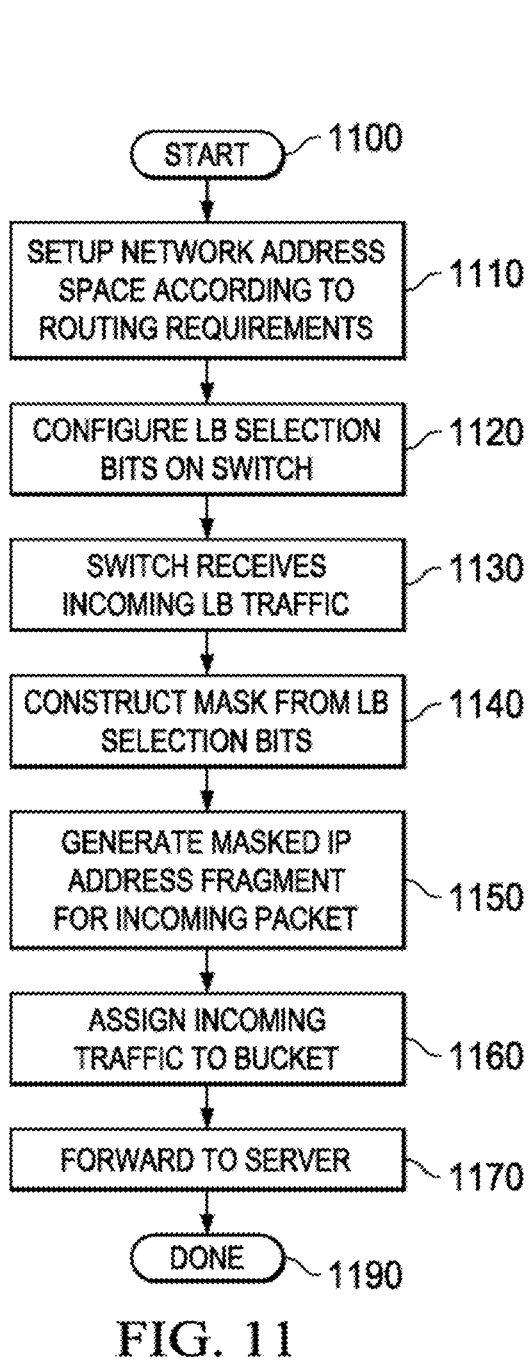

START — 1100

SETUP NETWORK ADDRESS SPACE ACCORDING TO ROUTING REQUIREMENTS — 1110

CONFIGURE LB SELECTION BITS ON SWITCH — 1120

SWITCH RECEIVES INCOMING LB TRAFFIC — 1130

CONSTRUCT MASK FROM LB SELECTION BITS — 1140

GENERATE MASKED IP ADDRESS FRAGMENT FOR INCOMING PACKET — 1150

ASSIGN INCOMING TRAFFIC TO BUCKET — 1160

FORWARD TO SERVER — 1170

DONE — 1190

FIG. 11

| TAG | RETURN |
|---|---|
| 23.214.187.39 | LB=1 |
| XXX.XXX.0.XXX | 192.168.1.0 |
| XXX.XXX.1.XXX | 192.168.1.1 |
| XXX.XXX.2.XXX | 192.168.1.2 |
| XXX.XXX.3.XXX | 192.168.1.3 |
| XXX.XXX.4.XXX | 192.168.1.4 |
| XXX.XXX.5.XXX | 192.168.1.5 |
| XXX.XXX.6.XXX | 192.168.1.6 |
| XXX.XXX.7.XXX | 192.168.1.7 |
| ... | ... |
| XXX.XXX.63.XXX | 192.168.1.63 |

TCAM TABLE 800

ADJUSTABLE BIT MASK FOR HIGH-SPEED NATIVE LOAD BALANCING ON A SWITCH

CROSS-REFERENCE TO RELATED APPLICATIONS

This application is a continuation of U.S. patent application Ser. No. 17/862,043 filed on Jul. 11, 2022, which is a continuation of U.S. patent application Ser. No. 16/420,009 filed on May 22, 2019, now U.S. Pat. No. 11,388,113 granted Jul. 12, 2022, which is a continuation of U.S. patent application Ser. No. 14/715,339 filed on May 18, 2015, now U.S. Pat. No. 10,305,816 granted May 28, 2019, which claims the benefit of U.S. Provisional Patent Application Ser. No. 62/141,158 filed on Mar. 31, 2015, the contents of which are incorporated by reference in their entireties.

FIELD OF THE DISCLOSURE

This disclosure relates in general to the field of communications and, more particularly, to a method and apparatus for providing adjustable bit masks for high-speed native load balancing on a switch.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other examples, the dimensions of the various features may be arbitrarily increased or reduced for clarity of discussion.

FIG. 6 is a flow chart of a method of load balancing according to one or more examples of the present Specification.

FIG. 11 is a flow chart of a method of IP address masking and load balancing selection according to one or more examples of the present Specification.

SUMMARY

Figure 1A:
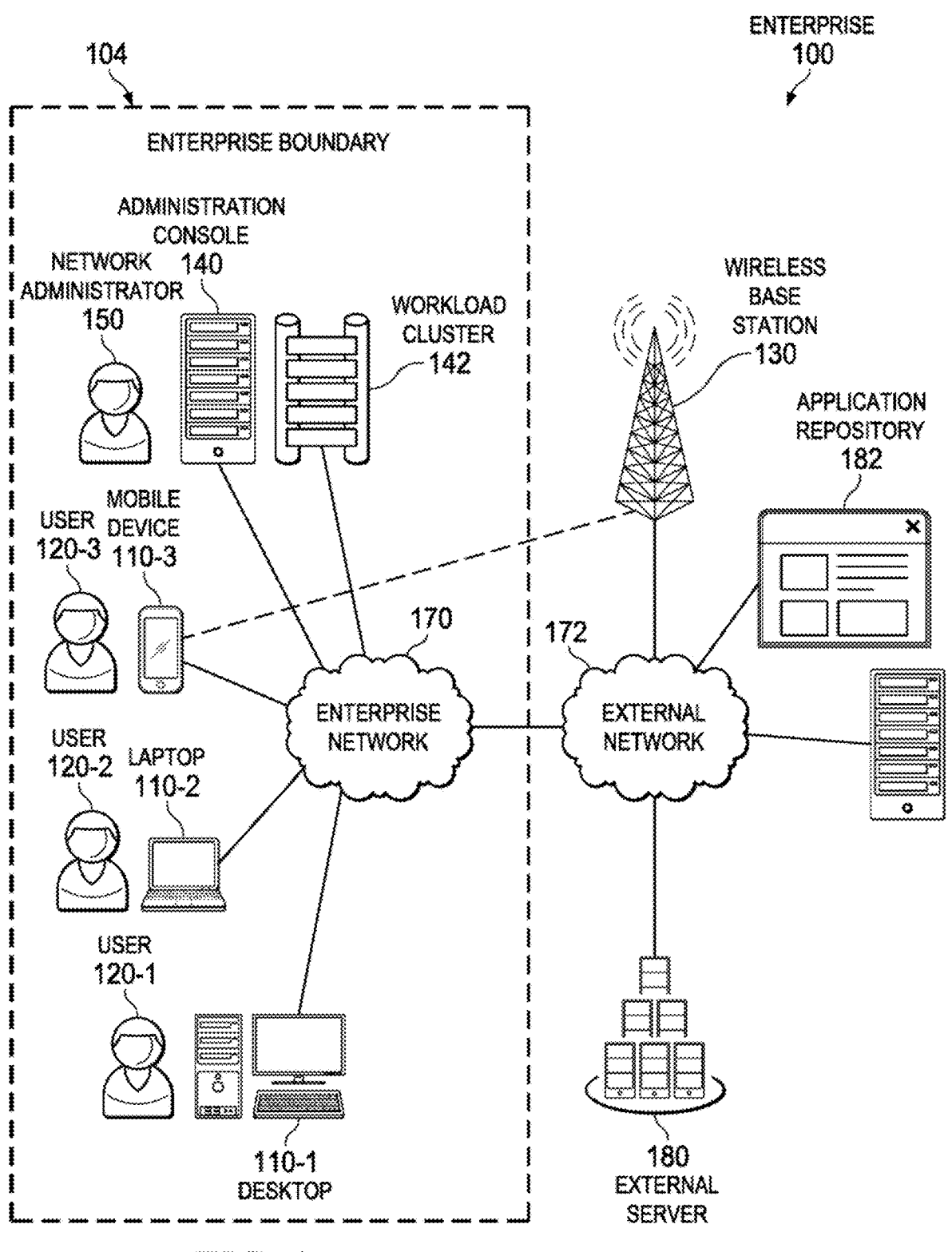
FIG. 1A is a network level diagram of an enterprise computing environment according to one or more examples of the present Specification.

In an example, a network switch is configured to natively act as a high-speed load balancer. Numerous load balancing techniques may be used, including one that bases the traffic "bucket" on a source IP address of an incoming packet. This particular technique provides a network administrator a powerful tool for shaping network traffic. For example, by assigning certain classes of computers on the network particular IP addresses, the network administrator can ensure that the traffic is load balanced in a desirable fashion. To further increase flexibility, the network administrator may apply a bit mask to the IP address, and expose only a portion, selected from a desired octet of the address.

DETAILED DESCRIPTION OF THE EMBODIMENTS

The following disclosure provides many different embodiments, or examples, for implementing different features of the present disclosure.

In an example of a known computing system, a cluster of workload servers may be provisioned, either as physical servers or as virtual machines, to provide a desired feature to end-users or clients. To provide just one nonlimiting example, the workload servers may provide a website. When a plurality of users make a large number of simultaneous connections to the website, it is necessary to appropriately distribute the workload among the various servers in the server farm.

To this end, incoming traffic from client devices may be routed to a network switch. The network switch may then forward the traffic to a load balancer. An example of a commonly used load balancer is a network appliance or virtual appliance running a Linux operating system and provided with a full network stack, as well as load-balancing logic for determining which server to send the traffic to.

For example, a workload cluster may include 16 nodes, either physical servers or virtual machines. The load balancer itself may also be either a physical appliance or a virtual appliance. Upon receiving a packet, the load balancer determines the load on each of the 16 workload servers. The load balancer then applies an algorithm to determine an appropriate node for handling the traffic. This may include, for example, identifying a least burdened node and assigning the traffic to that node. Each node may have its own IP address, which in one embodiment is not exposed to end-user client devices. Rather, client devices are aware only of the IP address of the load balancer itself. Thus, the load balancer may modify the packet header, for example, by assigning it to the virtual IP (VIP) of one of the workload servers. The load balancer may then return the packet to the switch, which routes the packet to the appropriate workload server.

In this example, the incoming packet transfers from the switch to the load balancer, which may provide the full OSI 7 layer "stack" in software, operating on a full-featured operating system, such as Linux. Thus, the incoming packet is abstracted up to one of the upper layers of the OSI model, such as layer 6 or 7, so that it can be handled by the load-balancing software. The packet is then de-abstracted to a lower layer and returned to the switch, which forwards it to the appropriate workload server. Upon receiving the packet, the workload server again abstracts the packet up to one of the higher levels of the OSI model.

The inventors of the present Specification have recognized that the load balancer, and its overhead, represent a potential bottleneck that reduces the scalability of the network environment, and slows down handling of network traffic. The process of passing the packet up and down the OSI stack, in particular, while very fast from a human point of view, can be a significant bottleneck from the point of view of a network.

However, the named inventors of the present Application have recognized that a network device, such as a switch or a router, can be configured to natively act as a load balancer in addition to performing its ordinary network switching function. In that case, rather than provide a load-balancing algorithm in an application running on an operating system, the switch may provide load-balancing via a much faster solution, such as programmable hardware rather than a general purpose software-driven processor. This means that the load-balancing logic is handled mostly or entirely at the hardware level. Furthermore, the switch generally operates at lower levels of the OSI model, such as layers 1 and 2. Thus, it has reduced overhead in abstracting and de-abstracting packets through the OSI stack.

Thus, the switch itself becomes the load balancer, and rather than acting as a bottleneck, is capable of providing terabit-class bandwidth by operating at the hardware level.

In an example, a concept of traffic buckets and nodes is described. Traffic may be divided into "buckets." Each bucket may be assigned to a node.

A traffic bucket serves as a classifier for identifying a subset of traffic to be redirected. As many traffic buckets can be created as needed for granularity. For bucketization of traffic, various L2/L3 header fields can be used in the algorithm.

By selecting different fields, many buckets can be created. By way of example, we can use B0, B1, B2, B3, B4 . . . . Bn to designate traffic buckets.

A traffic node serves as a "next-hop" for traffic forwarding. A node is an entity that has an associated IP address reachable from the switch. By way of example, we can use N0, N1, N2, N3 . . . . Nm to designate nodes.

Mapping can be established to associate a traffic bucket to a node. This association creates a packet path for forwarding of traffic for each bucket. This can include one-to-one mapping of a traffic bucket to a node, or many-to-one mapping of traffic buckets to a node (i.e., multiple nodes may be assigned to a single node).

This architecture realizes substantial advantages over certain existing deployments. For example, some existing load balancers suffer from shortcomings such as inefficiency and expense. In one example, a low capacity load-balancer provides approximately 40 Gbps, while a higher-end load balancer provides approximately 200 Gbps.

As discussed above, speed and scalability are enhanced by programming the load balancing engine in programmable hardware rather than in software running on a general-purpose processor programmed by software. Programmable hardware includes, for example, an application-specific integrated circuit (ASIC), field-programmable gate array (FPGA), programmable logic array (PLA), or similar. Because the logic is implemented directly in hardware, it can execute a "program" orders of magnitude faster than a CPU, which must fetch instructions from memory, and then run those instructions on general-purpose hardware. Furthermore, an operating system, multitasking, and multi-layer network stack introduce additional complexity that does not contribute directly to carrying out the load balancing function. In short, a software-programmable CPU is extremely versatile, and its function may be easily adapted to many different tasks, but it is relatively slow. A dedicated programmable hardware device, programmed only for a single function, is not versatile, but carries out its single, dedicated function very quickly.

In one example, a hardware-based load balancer of the present Specification must be able to handle both traffic that is to be load balanced, and traffic that does not require load balancing. For non-load-balanced traffic, the device should still perform its native function as a switch or router, and simply switch or route the traffic as appropriate.

To aid in this, and to preserve the speed advantage of the programmable hardware-based load balancing engine, it is advantageous not to store data values in standard memories such as random access memories (RAM), as this could negate the speed advantages of the hardware. Rather, in one example, a ternary content-addressable memory (TCAM) is provided, and may be capable of operating at speeds approaching the speed of the programmable hardware itself. A content-addressable memory (CAM) is a species of memory used in extremely high-speed searches, such as those necessary for native terabit-class load balancing. CAM compares the search input (tag) to a table of stored data, and returns the address of matching datum. This is in contrast to RAM, in which the program provides an address, and the RAM returns a value stored at that address. When a search is performed, if the CAM finds a match for the tag, the CAM returns the address of the tag, and optionally, the value of the tag as well. If the tag is not found, a "not found" value is returned. TCAM is a species of CAM, in which a tag can be searched not only for a binary "1" or "0," but also for a ternary "X" (don't care). In other words, the search tag "110X" matches both "1101" and "1100."

In the context of load balancing, a network administrator may configure a virtual IP (VIP) tag, including in one example an IP address, protocol, and port number. Entries may be made in the TCAM for VIP tags that are to be load balanced. Entries may also be made for a set of nodes that can receive traffic matching that VIP tag.

The switch advertises the VIP tag via routing protocols, and receives traffic destined for VIP. When traffic enters the switch or router, the VIP tag is checked against entries in the TCAM. If there is a matching entry, the traffic is to be load balanced. The traffic is then bucketized and load balanced to each node using TCAM entries.

This architecture realizes several important advantages. As servers move from 1 Gbps to 10 Gbps, traditional software load balancers have to scale appropriately. Load balancer appliances and service modules also consume rack-space, power, wiring and cost. However, in an embodiment of the present Specification:

Every port of a switch or router can act as a load-balancer.

No external appliance and no service module are needed.

The teachings of this Specification can be used to provide terabit-class load balancing.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with a load-balancing engine, which in this case may include dedicated hardware, firmware, or very low-level software such as BIOS to provide the load-balancing logic.

A system and method for native load balancing on a switch will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple IOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Enterprise 100 may encounter a variety of "network objects" on the network. A network object may be any object that operates on or interacts with enterprise network 170. In one example, objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, for example, a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, an external server 180, and an application repository 182 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Application repository 182 may represent a Windows or Apple "App Store" or update service, a Unix-like repository or ports collection, or other network service providing users 120 the ability to interactively or automatically download and install applications on client devices 110. In some cases, secured enterprise 100 may provide policy directives that restrict the types of applications that can be installed from application repository 182. Thus, application repository 182 may include software that is not malicious, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Figure 1B:
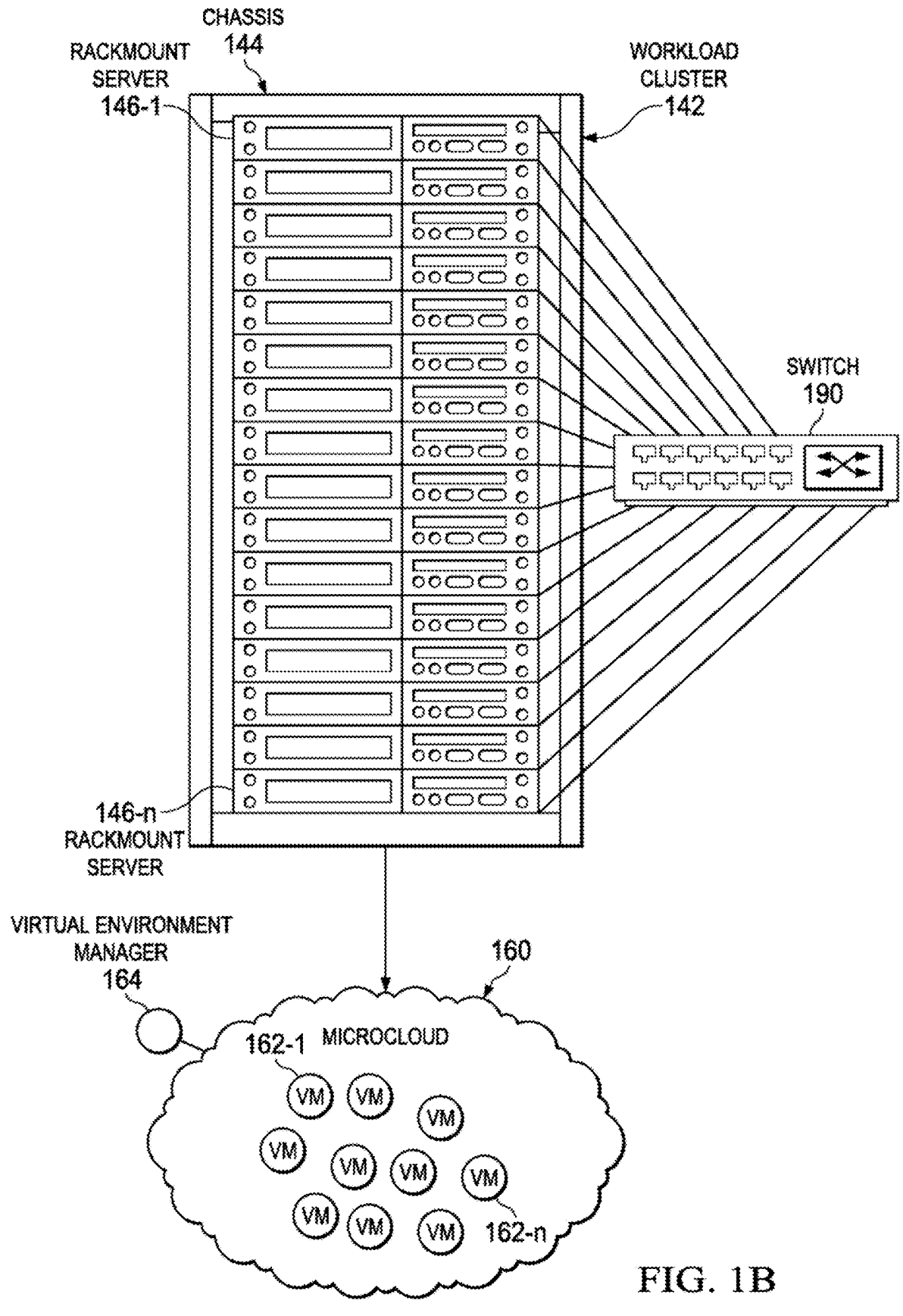
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2A:
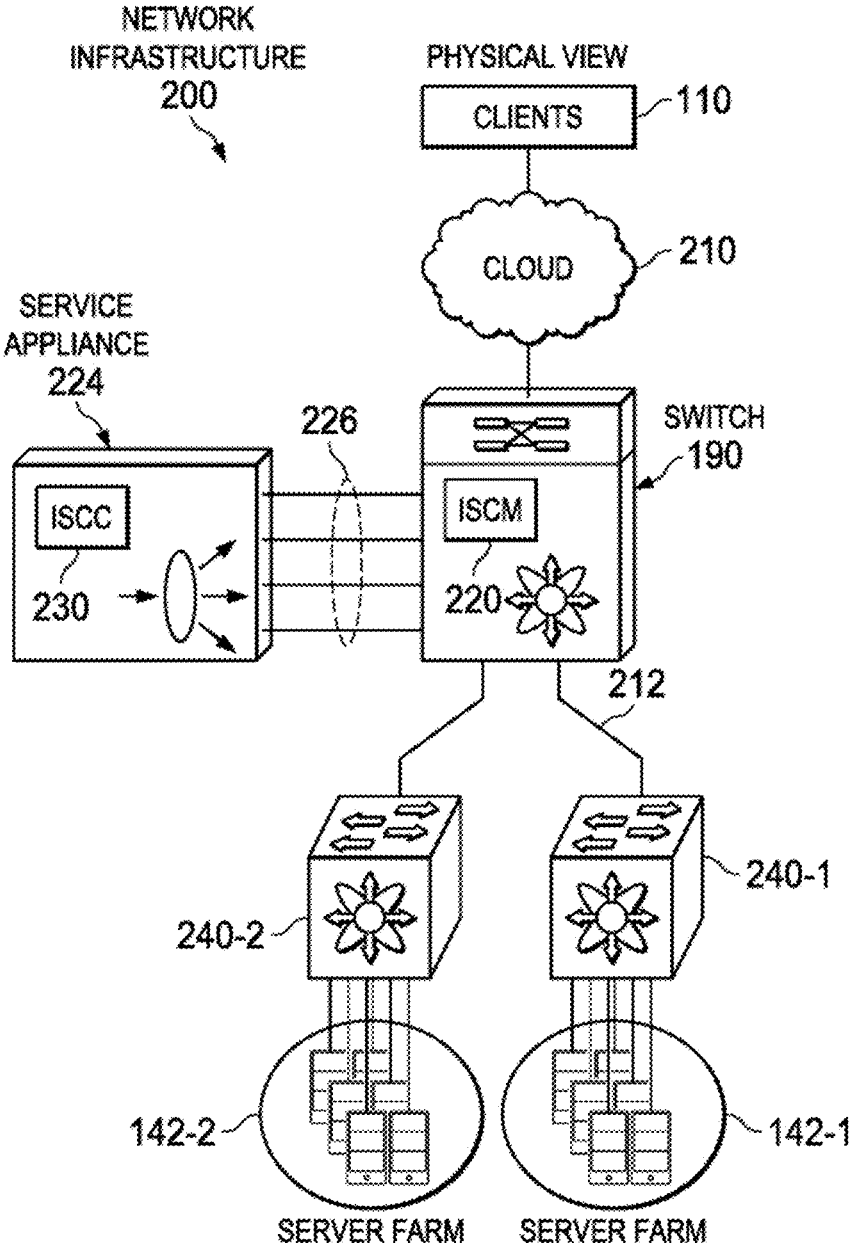
FIG. 2A is a is a simplified schematic diagram illustrating a physical view of a system for providing service appliances in a network environment according to one or more examples of the present Specification.
Figure 2B:
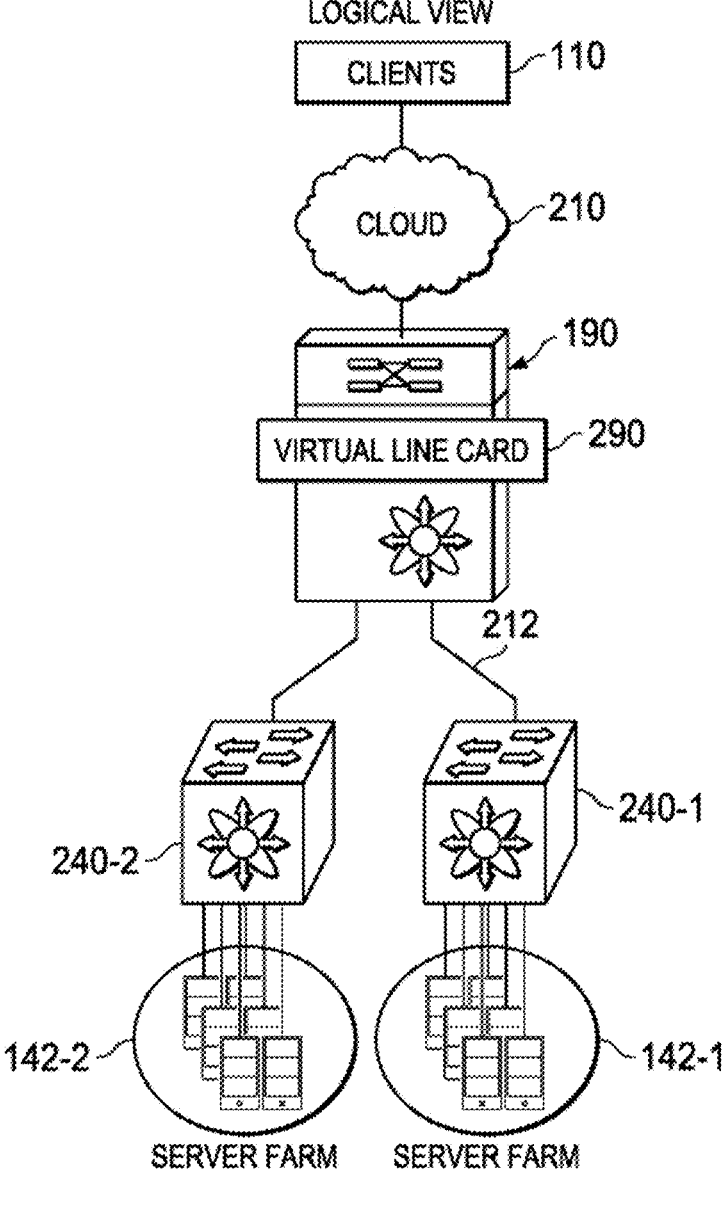
FIG. 2B is a simplified schematic diagram illustrating a logical view of the system according to one or more examples of the present Specification.

FIGS. 2A and 2B show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 2A is a simplified schematic diagram illustrating a physical view of a system 110 for providing service appliances in a network environment. FIG. 2A includes a network (illustrated as multiple links 212) that connects one or more server farms 142-1 and 142-2 to one or more clients 110 via a cloud 210. Cloud 210 may encompass any public, semi-public, and/or private networks including enterprise networks, an Internet or intranet, community networks, etc. Individual servers in server farm 142-1 and 142-2 may communicate within the same farm via switches 240-1 and 240-2, respectively. Servers in server farm 142-1 may communicate with servers in server farm 142-2 via a switch 190 in this particular example implementation.

A service appliance 224 may connect to switch 190 over a communication channel 226 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 110, communication channel 326 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc. In some cases, switch 190 may be configured with an intelligent service card manager module (ISCM) 220, and service appliance 224 may be configured with a corresponding intelligent service card client module (ISCC) 230. ISCM

220 and ISCC 230 can form part of a Remote Integrated Service Engine (RISE) infrastructure for configuring service appliance 224 on the switch, e.g., as a virtual line card in switch 190.

FIG. 2B is a simplified schematic diagram illustrating a logical view of system 110. In some cases, ISCC 230 and ISCM 220 may be configured to allow service appliance 224 to appear as a virtual line card 290, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 290 is interchangeable (in certain instances) with ISCM 220. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

In an example, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 110. For example, setting up service appliance 224 for network configurations may be unnecessary. Substantially all such configurations may be made via switch 190, instead of service appliance 224. Service appliance 224 may offload (i.e., transfer) any network (e.g., L2/L3 network) specific control plane and data plane operations to switch 190. Data path acceleration that leverages an application specific integrated circuit (ASIC) (potentially embedded in switch 190) may also be possible in various embodiments. Switch 190 may communicate control messages to service appliance 224 over communication channel 326. Thus, configuration and provisioning of services within service appliance 224 may be implemented via switch 190.

Note that the numerical and letter designations assigned to the elements of FIGS. 2A and 2B do not connote any type of hierarchy; the designations are arbitrary and have been used for purposes of teaching only. Such designations should not be construed in any way to limit their capabilities, functionalities, or applications in the potential environments that may benefit from the features of system 110. For case of description, only two representative server farms are illustrated in FIGS. 2A and 2B. Any number of server farms and switches may be connected in the network without departing from the broad scope of the present disclosure.

For purposes of illustrating the techniques of system 110, it is important to understand the communications in a given system such as the system shown in FIGS. 2A and 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 2A and 2B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 2A and 2B may be coupled to one another through one or more interfaces employing any suitable connection (wired or wireless), which provides a viable pathway for electronic communications. Additionally, any one or more of these elements may be combined or removed from the architecture based on particular configuration needs. System 110 may include a configuration capable of transmission control protocol/Internet protocol (TCP/IP) communications for the electronic transmission or reception of packets in a network. System 110 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 110, including switches 190, 240-1, and 240-2, may include any type of network element connecting network segments. For example, switches 190, 240-1, and 240-2 may include a multi-port network bridge that processes and routes data at a data link layer (Layer 2). In another example, switches 190, 240-1, and 240-2 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 190, 240-1, and 240-2 may be integrated into other network devices such as gateways, routers, or servers. In various embodiments, switches 190, 240-1, and 240-2 may be managed switches (e.g., managed using a command line interface (CLI), a web interface, etc.).

Communication channel 326 may include a port-channel, which can encompass an aggregation of multiple physical interfaces into one logical interface, for example, to provide higher aggregated bandwidth, load balancing and link redundancy. Communication channel 326 with multiple links can provide a high availability channel: if one link fails, traffic previously carried on this link can be switched to the remaining links. Communication channel 326 may contain up to 16 physical communication links and may span multiple modules for added high availability. In one embodiment, communication channel 326 can represent a port-channel with an aggregation of four point-to-point communication links over multiple ports. In another embodiment, communication channel 326 can represent a virtual port-channel (vPC).

Although FIGS. 2A and 2B show server farms 142-1 and 142-2, it should be appreciated that system 110 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, system 110 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
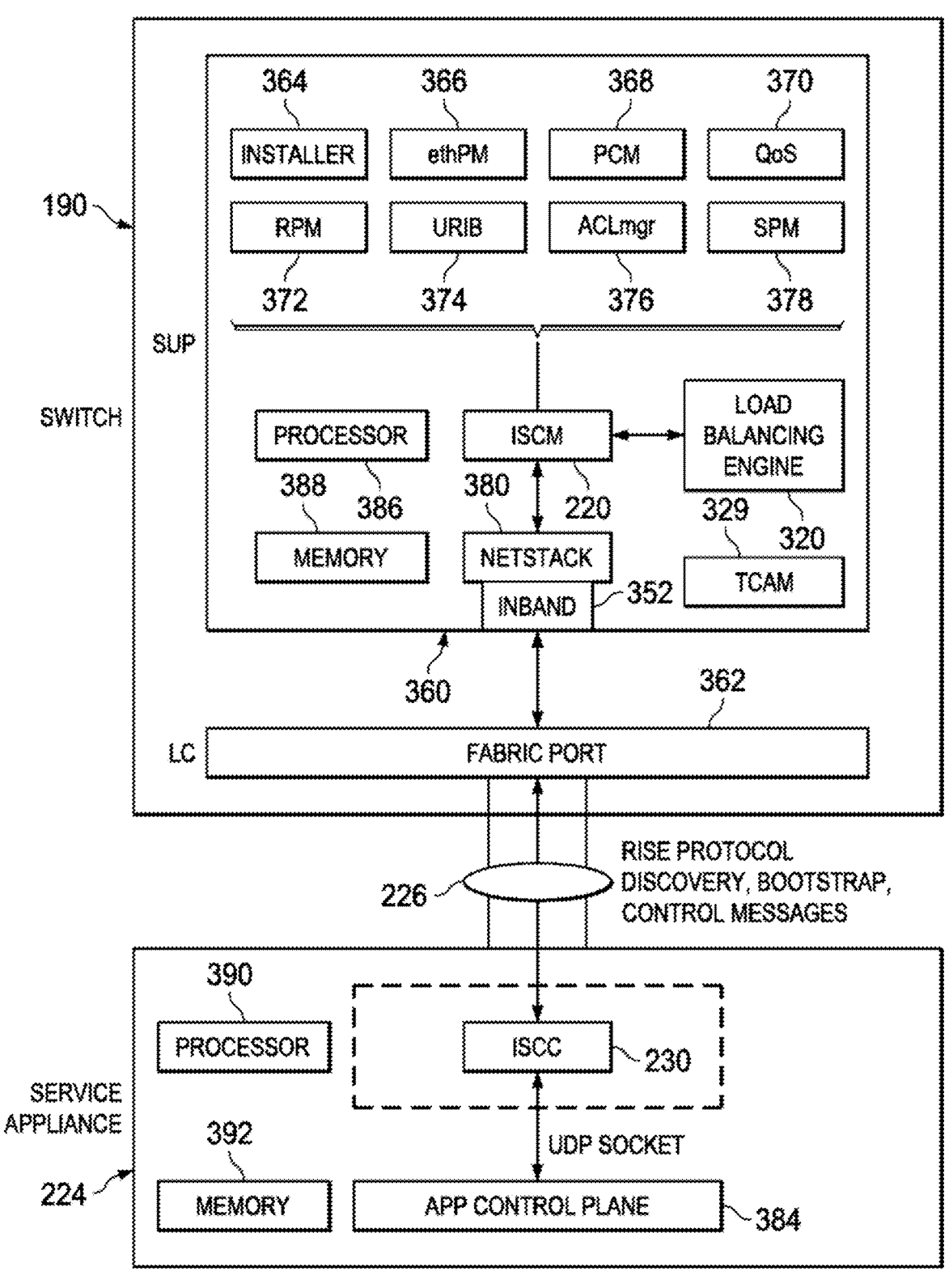
FIG. 3 is a block diagram of a network switch according to one or more examples of the present Specification.

FIG. 3 is a simplified block diagram illustrating example details of system 110 according to embodiments of the present disclosure. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QOS) element 370, a route policy manager (RPM) 372, a unified/unicast routing information base (URIB) 374, an access control list manager (ACLmgr) 376, and a service policy manager (SPM) 378 for performing various routing and/or management functions. ISCM 220 may be provisioned in supervisor engine 360 to provide RISE related functionalities. ISCM 220 may manage one or more service modules, including in-chassis service modules and remote service modules.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processor may also be provided for specialized or support functions. In some examples, the processor is a programmable hardware device, which in this Specification expressly excludes a general-purpose CPU.

Load balancing engine 320, in one example, is operable to carry out computer-implemented methods as described in this Specification. Load balancing engine 320 may include one or more processors, and one or more non-transitory computer-readable mediums having stored thereon executable instructions operable to instruct a processor to provide load balancing. As used throughout this Specification, an "engine" includes any combination of one or more logic elements, of similar or dissimilar species, operable for and configured to perform one or more methods provided by load balancing engine 320. Thus, load balancing engine 320 may comprise one or more logic elements configured to provide methods as disclosed in this Specification. In some cases, load balancing engine 320 may include a special integrated circuit designed to carry out a method or a part thereof, and may also include software instructions operable to instruct a processor to perform the method. In some cases, load balancing engine 320 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that load balancing engine 320 may also include other hardware and software, including configuration files, registry entries, and interactive or user-mode software by way of non-limiting example.

In one example, load balancing engine 320 includes executable instructions stored on a non-transitory medium operable to perform a method according to this Specification. At an appropriate time, such as upon booting the device or upon a command from the operating system or a user, the processor may retrieve a copy of software from storage and load it into memory. The processor may then iteratively execute the instructions of load balancing engine 320 to provide the desired method.

In another example, load balancing engine 320 includes logic executed on an ASIC, FPGA, or other low-level hardware device specifically programmed to carry out the functions of load balancing engine 320. In one case, any portions of load balancing engine 320 that are not hard-coded into the logic may be loaded from a firmware or similar memory. In this case, load-balancing engine 320 may operate without the benefit of an operating system, to improve speed and efficiency.

Load balancing engine 320 may also communicatively couple to a TCAM 329. TCAM 329 may be configured to provide high-speed searching as disclosed herein.

According to various embodiments, ISCM 220 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. ISCM 220 may be a finite state machine utility (FSMU) based application (e.g., which indicates an abstract machine that can be in one of a finite number of states). In various embodiments, ISCM 220 may have a well-defined MTS seamless authentication protocol (MTS SAP) assigned and it can open a socket-based MTS queue and bind to the well-defined SAP such that other processes may communicate with it.

In various embodiments, ISCM 220 may also maintain an array of MTS operation code ("opcode"), which can define how to process a received MTS message. The array may include per-opcode specific MTS flags, handler functions, etc. ISCM 220 may be configured to receive CLI driven MTS messages, MTS notifications (such as event driven messages indicating, for example, that a particular VLAN is up or down), and MTS request/responses. In various embodiments, ISCM 220 may be configured so that MTS-based communication with other processes may be non-blocking and asynchronous. Thus, ISCM 220 may handle multiple events (which can arrive at any time) for the same resource such that the state of the resource is consistent (and not compromised). A similar opcode can be provided even in non-MTS messages, which serves to indicate how to a switch or a service can process the message.

After ports (e.g., appliance ports and switch ports) have been configured in RISE mode, ISCM 220 and ISCC 230 may perform auto-discovery and bootstrap to establish an appropriate control channel. After the control channel is established, applications in service appliance 224 may send control messages (e.g., using the UDP socket interface) to ISCC 230 through an application control plane 384. Application control plane 384 generally encompasses one or more software components for performing workflow management, self-management, and other application control layer processes. ISCC 230 may forward the control messages to ISCM 220 of switch 190 over communication channel 326. In example embodiments, ISCM 220 and ISCC 230 may communicate via UDP packets; however, various other protocols and formats may be accommodated by the teachings of the present disclosure. Supervisor 360 may be provisioned with (or have access to) processor 386 and a memory 388 for performing its various functions. ISCM 220 may use processor 386 and memory 388 to perform RISE related functions in switch 190. Similarly, service appliance 224 may be provisioned with (or have access to) a processor 390 and a memory 392. ISCC 230 may use processor 390 and memory 392 to perform RISE related functions in service appliance 224.

Figures 4, 5:
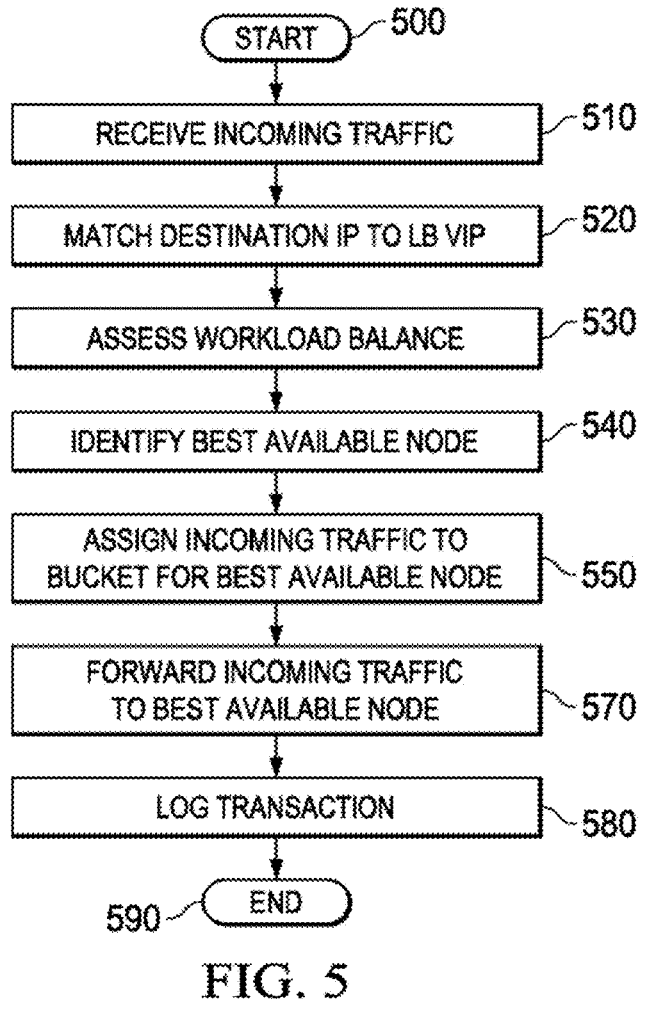
FIG. 4 is a block diagram of a routing table according to one or more examples of the present Specification.
FIG. 5 is a flow chart of a method performed by a switch according to one or more examples of the present Specification.

FIG. 4 is a block diagram of a routing table 400 according to one or more examples of the present Specification. In this example, four nodes are provided, designated node N0, N1, N2, and N3. Each node represents a server appliance having a unique VIP, whether a dedicated hardware server appliance or a virtual server appliance.

Load-balancing engine 320 designates 8 traffic buckets, labeled B0, B1, B2, B3, B4, B5, B6, and B7. Based on load and demand, load-balancing engine 320 maps each traffic bucket to an appropriate node. In this example, buckets B0 and B4 are mapped to node N0. Buckets B1 and B5 are mapped to node N1. Buckets B2 and B6 are mapped to node N2. Buckets B3 and B7 are mapped to node N3. These mappings are provided by way of nonlimiting example only, and are provided strictly to illustrate the principle of mapping buckets to nodes.

When switch 190 receives incoming traffic, load-balancing engine 320 operates to execute an appropriate algorithm for assigning the incoming traffic to a traffic bucket. This may include, for example, random or pseudorandom assignment, round robin scheduling, or any suitable scheduling algorithm. In one example, an algorithm may be based on the source IP address of the incoming packet, as described in more detail in connection with FIGS. 7 and 8.

After assigning the traffic to a bucket, switch 194 modifies the packet with the appropriate VIP for the node servicing that bucket, and forwards the packet.

When a response comes, switch 194 modifies the packet to reflect the publically visible IP address of switch 194, so that the load balancing is completely invisible to external hosts.

FIG. 5 is a flowchart of an example method 500 performed by load-balancing engine 320 according to one or more examples of the present Specification.

In block 510, switch 190 receives incoming traffic and provides the incoming traffic to load-balancing engine 320.

In block 520, switch 190 compares the destination IP of the incoming traffic to the VIP designated for load balancing. If there is a match, the incoming traffic is provided to load balancing engine 320 for load balancing. If not, then switch 190 simply routes or switches the traffic according to its normal function.

In block 530, load-balancing engine 320 assesses workload balance for available workload servers. As described above, this may be performed via round-robin assignment, random or pseudo-random assignment, or any other suitable load balancing algorithm.

In block 540, load-balancing engine 320 identifies the best available node for servicing the incoming traffic, based on the assessing of block 530.

In block 550, according to the identifying of block 540, load-balancing engine 320 assigns the incoming traffic to a bucket for associated with the best available node. Assigning to a node may comprise modifying the header to reflect the VIP for the assigned node.

In block 570, after load-balancing engine 320 has assigned the traffic to an appropriate bucket and thereby to an appropriate node, switch 190 forwards the incoming traffic to the node designated for servicing that bucket, specifically by forwarding the traffic to the appropriate VIP.

In block 580, load-balancing engine 320 may log the transaction, as appropriate or necessary.

In block 590, the method is done.

FIG. 6 illustrates a method of performing load balancing on a switch with the aid of a TCAM, such as TCAM 329 according to one or more examples of the present Specification. This example employs the notion of a flow. In an example, a flow is uniquely identified by a tuple T, comprising src-ip (source IP address), dst-ip (destination IP address), protocol, L4-src-port (layer 4 source port) and L4-dst-port (layer 4 destination port).

In an example, a client device 110-1 sends a packet directed to a VIP serviced by switch 190. By way of illustration, this flow is referred to as F1, and tuple T1 identifies flow F1. Tuple T1 comprises (Dev-110-1-IP, VIP, TCP, L4-src-port, L4-dest-port).

Similarly client device 110-2 initiates traffic to the same VIP. Since client 110-2's IP address is different from client 110-1's, this flow will have a different Tuple. By way of illustration, this is referred to as flow F2, identified by tuple T2. Tuple T2 comprises (Dev-110-2-IP, VIP, TCP, L4-src-port, L4-dest-port).

In various examples, sets of buckets may be part of a "pool," and one or more pools can be assigned to a single VIP, allowing VIP traffic to be load balanced among server nodes.

Referring now to method 600 in FIG. 6, it is assumed that switch 190 has now received flows F1 and F2.

In block 610, TCAM 329 looks up the IP address of VIP as it appears in both flows. In this example, both flows are directed to VIP, which is a virtual IP address for a service provided by servers in workload cluster 142. Thus, switch 190 can quickly determine that flows F1 and F2 are to be load balanced.

In block 620, load balancing engine 320 assigns each node to a traffic bucket as described herein. In certain examples, this may be accomplished by any of the load balancing algorithms disclosed herein, or by any other appropriate load balancing algorithm. In one example, assigning each flow to a bucket comprises assigning according to method 900 of FIG. 9, based on Dev-110-1-IP and Dev-110-2-IP respectively. In that case, TCAM 329 may include a table mapping masked IP address fragments to traffic buckets.

In block 640, load balancing engine 320 assigns each flow to a node for servicing, such as a workload server in workload cluster 142. This may be a deterministic assignment based on the traffic bucket that each flow was assigned to. For increased speed, this may also be performed using TCAM 329. For example, TCAM 329 may include a table mapping traffic buckets to service nodes.

In block 660, load balancing engine 320 rewrites the L2 header for the incoming packets. For example, assuming that flow F1 was assigned to service node 1 in workload cluster 142, and flow F2 was assigned to service node 2 in workload cluster 142, load balancing engine 320 rewrites the L2 headers for the packets in those flows to direct them to their respective service nodes.

In block 680, switch 190 is finished with its load balancing tasks, and now acts as a switch, switching or routing the packets to the nodes provided by their new L2 headers.

Blocks 610 through 680 are repeated for each incoming packet, with an appropriate bucket and service node being selected for each. Assuming a well-configured load balancing engine 320, packets will be well distributed across available service nodes in workload cluster 142 so that workload is optimally distributed across available service nodes.

Reverse traffic (response from service nodes to client devices) are delivered directly to the respective clients without any intervention from load balancing engine 320.

Figure 7:
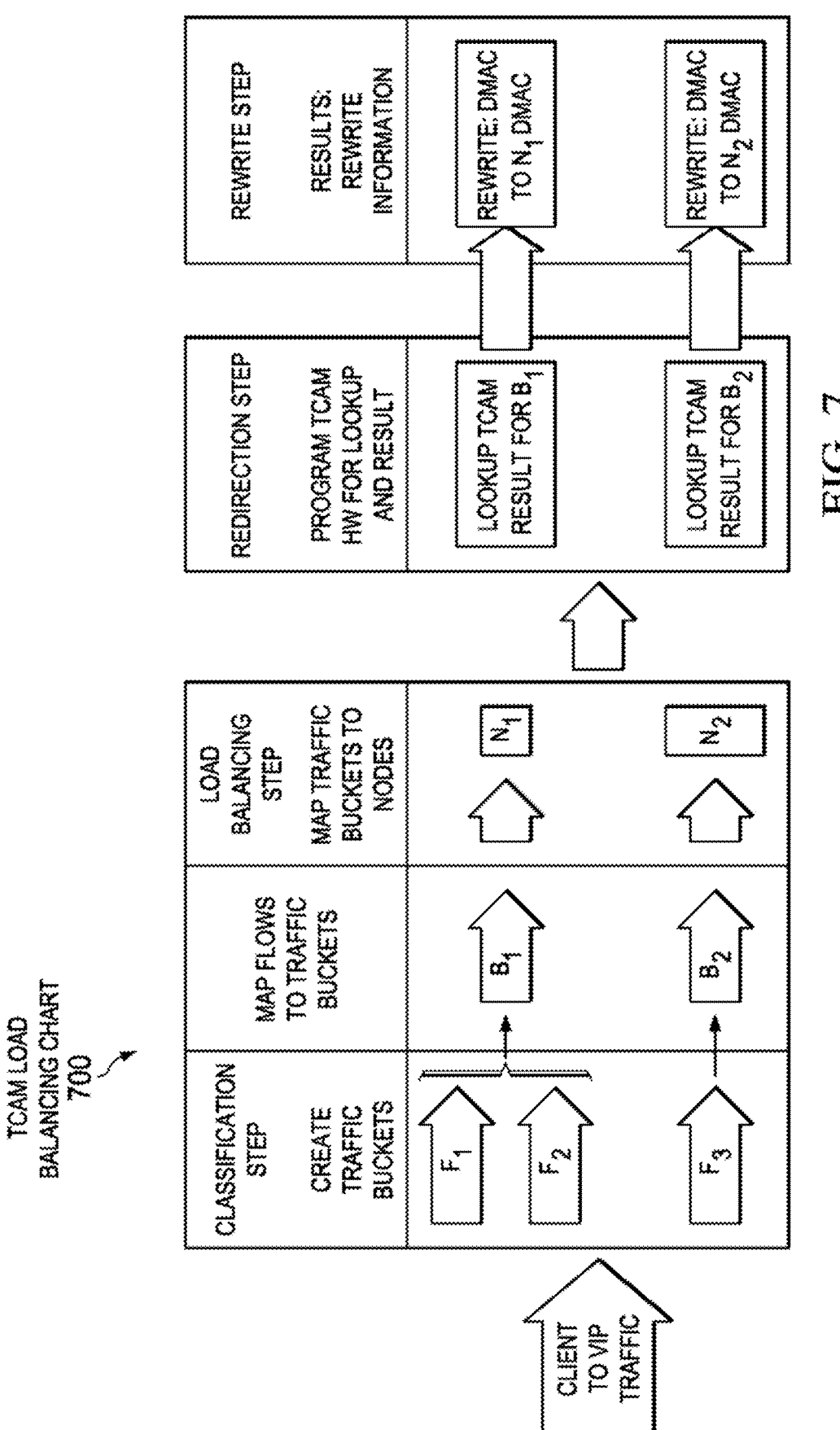
FIG. 7 is a block diagram of a method according to one or more examples of the present Specification.

FIG. 7 is a block diagram view 700 of method 600 as described in FIG. 6.

Figures 8, 9:
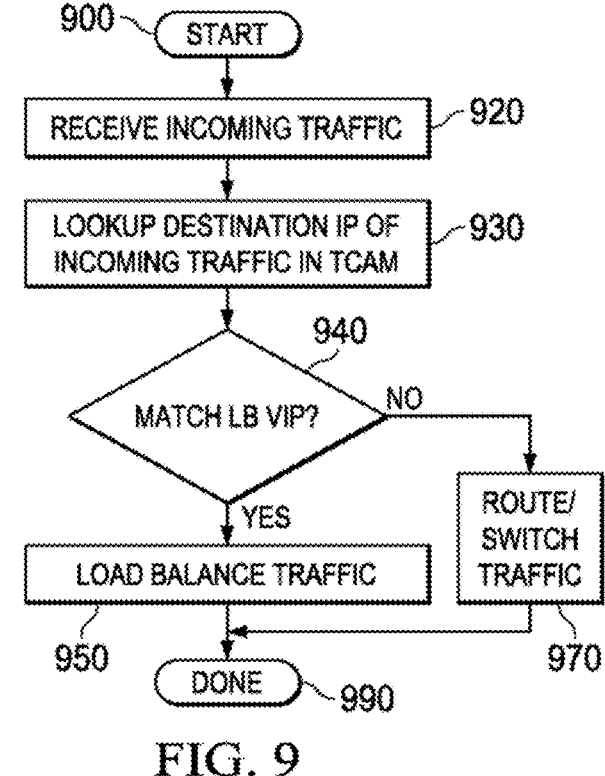
FIG. 8 is a block diagram of a TCAM table according to one or more examples of the present Specification.
FIG. 9 is a block diagram of a method according to one or more examples of the present Specification.

FIG. 8 is an example of a load balancing table 800 that may be found in an example of TCAM 329. In this example, TCAM 329 is configured to receive as an input a search tag, and to output a stored value associated with the search tag. In this example, a first tag is the IP address 23.214.187.39, which is a VIP that is to be load balanced to one of 63 available service nodes 142. When switch 190 receives an incoming packet, it checks the destination IP address of the packet against table 800. If the value is found, TCAM 329 may return a value such as "LB=1," or some other value indicating that the destination IP matches a VIP that is to be load balanced. The incoming packet is then passed to load balancing engine 320.

Load balancing engine 320 then performs its load balancing function. For example, load balancing engine 320 may search the source IP of the incoming packet against TCAM 329. Because TCAM 329 is a ternary CAM, it accepts "X" or "don't care" as a valid input. Thus, the IP address is self-masking within TCAM 329. Specifically, if octet 3 of the source IP is selected as a load balancing key, then a value of the form "XXX.XXX.???. XXX" is used as the search term. TCAM 329 masks the first, second, and fourth octets ("don't care"), and matches only if "???" matches one of the third octet values. If the network is properly configured, then this value will be between 0 and 63, and the packet will be routed to the corresponding IP address for the correct service node, as shown in the table.

For additional flexibility, there may not be one-to-one mapping between source IP addresses and service nodes. For example, all 256 available values of the fourth octet may be usable, even though there are only 64 service nodes. In that case, four traffic buckets may be assigned to each service node. TCAM 329 may return an identifier for a traffic bucket rather than a direct IP address, and an additional table may be used to map buckets to IP address. While this is extremely flexible, it does involve an extra mapping step. If speed is at a premium over flexibility, the same destination IP address may simply be returned directly for each of four different source IP addresses (again, based only on the third octet). It should also be noted that the number of service nodes need not be evenly divisible by the number of buckets, and buckets need not be evenly distributed across service nodes. In general, any effective number of buckets can be assigned to any effective number of service nodes.

FIG. 9 is a flow chart of a method 900 according to one or more examples of the present Specification.

In block 920, switch 190 receives incoming traffic.

In block 930, switch 190 looks up the destination IP address of the incoming packet in TCAM 329.

In decision block 940, switch 190 checks to determine whether the destination IP address of the incoming packet matches the VIP assigned for load balancing.

In block 950, if there is a match, switch 190 provides the packet to load balancing engine 320. Load balancing engine 320 then performs its load balancing function as described herein.

Returning to block 940, if there is no match with the load balanced VIP, then switch 190 will merely act as a switch, and in block 970 will perform its ordinary traffic routing or switching function.

In block 990, the method is done.

Figure 10:
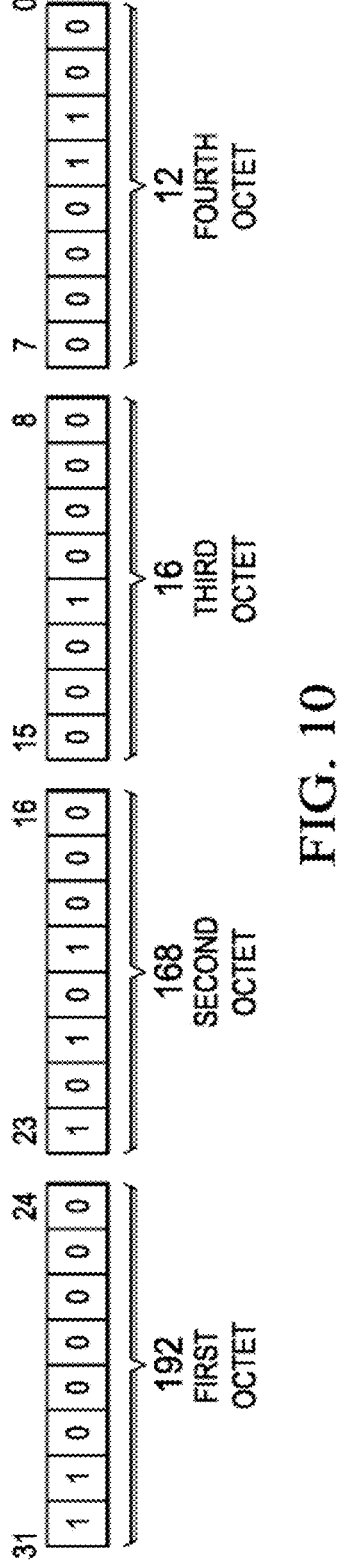
FIG. 10 is a block diagram of IP address masking according to one or more examples of the present Specification.

FIGS. 10 and 11 illustrate a method of load balancing that, in some embodiments, may be particularly suited to the high speeds attainable using TCAM on a switch.

In this example, an n-bit fragment from the source IP address of an incoming packet is used to deterministically select one of $2^n$ available service nodes. For example, if 256 service nodes are available in workload cluster 142, an 8-bit fragment of the source IP address may be used for load balancing. This takes advantage of the TCAM, because load-balancing engine 320 can use TCAM 329 to quickly correlate an address fragment to an IP address assigned to the node that is to handle the packet.

For example, as seen in FIG. 10, if an 8-bit fragment is used, then the IPV4 address may be conveniently divided into four octets, consistent with convention. In one example, security administrator 150 selects the third octet of the IPV4 address as the load balancing fragment. An incoming packet comes from IP address 192.168.15.12, directed to VIP address 200.4.12.20. If node 0x0F is at IP address 10.0.0.15, then load balancing engine 320 can query TCAM 329 with the value 0x0F. TCAM 329 returns the corresponding IP address, 10.0.0.15. Load balancing engine 320 then modifies the L2 header for the incoming packet, substituting the address 192.168.0.15.

FIG. 11 is a flow chart of a method 1100 according to one or more examples of the present Specification. This method corresponds, in certain embodiments, to the block diagram in FIG. 7.

In block 1110, network administrator 150 sets up the network according to desired routing features. This may include, for example, configuring IP addresses according to a desired load balancing topology, or setting up sub-networks that may be load balanced together. For example, if there are 64 service nodes available, network administrator 150 may choose bits 8-13 of the second octet (see FIG. 8) for load balancing. Network administrator 150 can then divide the network into 64 sub-networks, with each sub-network having an IP address of the form 192.168.XX.YY, wherein "XX" is some number between 0 and 63, and "YY" is any number between 0 and 255. Thus, this network is configured to accommodate up to 64*256=16,384 clients, with each client having an IP address with a third octet between 0 and 63, and traffic from the clients deterministically load balanced according to the third octet.

In block 1120, security administrator 150 configures switch 190 with the appropriate load balancing bits. For the example discussed above, this includes configuring switch 190 to use six bits from the third octet to designate up to 64 service nodes.

In block 1130, switch 190 receives incoming load balanced traffic. Note that in certain embodiments, the method of FIG. 9 may be used to determine whether the traffic is to be load balanced.

In block 1140, switch 190 constructs a bitmask from the user configuration. In this example, an AND-style bitmask may be used with the mask 00000000 00000000 00111111 00000000.

In block 1150, load balancing engine 320 applies the mask to the IP address. In the above example, the result may be right shifted by 8 bits, thus yielding an IP address fragment that consists of only the six selected bits from the second octet. The bit mask and right shift may be adjusted to select any number of bits from any octet, or bits spanning two different octets. Note that in some embodiments, masking is performed directly in TCAM 329, in which case the masking is not performed as a separate operation in the programmable hardware.

In block 1160, load balancing engine 320 assigns the packet to a service node based on its load balancing method. This may include looking up the IP address fragment in TCAM 329. In response TCAM 329 may return the IP address of the service node configured to handle traffic with the given IP address fragment. Load balancing engine 320 may then modify the L2 header (or other appropriate header) of the incoming packet with the correct IP address of the service node that will handle the packet.

In block 1170, switch 190 performs its switching function by switching or routing the incoming packet to the appropriate service node.

In block 1190, the method is done.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 110 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 110 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 110 may be applicable to other exchanges, formats, or routing protocols. Moreover, although system 110 has been illustrated with reference to particular elements and operations that facilitate the communication process, these elements, and operations may be replaced by any suitable architecture or process that achieves the intended functionality of system 110.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

By way of nonlimiting example, there is disclosed a network apparatus for providing native load balancing within a switch, comprising: a first network interface operable to communicatively couple to a first network; a plurality of second network interfaces operable to communicatively couple to a second network; one or more logic elements comprising a switching engine operable for providing network switching; and one or more logic elements comprising a load balancing engine operable for: receiving incoming network traffic via the first network; and assigning the incoming traffic to a traffic bucket associated with the second network; wherein the switching engine and load balancing engine are configured to be provided on the same hardware as each other and as the first network interface and plurality of second network interfaces.

There is further disclosed an example, wherein the load balancing engine is further operable for operating exclusively at or below a network layer of a network model.

There is further disclosed an example, wherein the load balancing engine is further operable for operating exclusively at or below a data link layer of a network model.

There is further disclosed an example, wherein the load balancing engine is further operable for mapping at least one bucket to a node on the second network.

There is further disclosed an example, wherein the load balancing engine is further operable for logging the mapping.

There is further disclosed an example, wherein the load balancing engine is further operable for forwarding the traffic to the node.

There is further disclosed an example, wherein the load balancing engine is further operable for logging the forwarding.

There is further disclosed an example, wherein the load balancing engine comprises programmable hardware.

There is further disclosed an example of a method comprising performing the operations disclosed in any of the preceding examples.

There is further disclosed an example of one or more non-transitory computer-readable mediums having stored thereon executable instructions for performing the method or the operations of any of the preceding examples.

There is further disclosed an example comprising means for performing the method, or operating the computer-readable medium of any of the preceding examples.

There is further disclosed an example wherein the means comprise a processor and a memory.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A switch comprising:
at least one processor; and
a memory storing instructions which when executed by the at least one processor, causes the at least one processor to:
receive an incoming network packet;
identify whether to load balance the incoming network packet across a plurality of service nodes;
in response to identifying whether to load balance the incoming network packet, mask, by a bitmask, a portion of a source address or a destination address of the incoming network packet to expose a fragment of the source address or the destination address, respectively;
adjust the bitmask to select a specific number of bits of the source address to be masked; and
assign the incoming network packet to a service node of the plurality of service nodes by identifying an address of the service node from the fragment of the source address or the destination address based on a mapping of fragments of source addresses or destination addresses to addresses of traffic buckets of the plurality of service nodes.

2. The switch of claim 1, wherein the bitmask is constructed from a configuration.

3. The switch of claim 2, wherein the configuration includes a starting position or a bit width.

4. The switch of claim 1, further comprising a ternary content-addressable memory,
wherein the mapping is stored at the ternary content-addressable memory; and
wherein identifying the address of the service node is performed by looking up the fragment in the ternary content-addressable memory.

5. The switch of claim 1, wherein the specific number of bits are in any octet of the source address or spanning more than one octet of the source address.

6. The switch of claim 1, wherein the bitmask is an AND mask.

7. The switch of claim 1, further comprising instructions, which when executed by the at least one processor, causes the at least one processor to:

shift the bitmask a number of bits to yield the specific number of bits in the fragment spanning one or more octets of the source address.

8. A method comprising:

receiving an incoming network packet;

identifying whether to load balance the incoming network packet across a plurality of service nodes;

in response to identifying whether to load balance the incoming network packet, masking, by a bitmask, a portion of a source address or a destination address of the incoming network packet to expose a fragment of the source address or the destination address, respectively;

adjusting the bitmask to select a specific number of bits of the source address to be masked; and assigning the incoming network packet to a service node of the plurality of service nodes by identifying an address of the service node from the fragment of the source address or the destination address based on a mapping of fragments of source addresses or destination addresses to addresses of traffic buckets of the plurality of service nodes.

9. The method of claim 8, wherein the bitmask is constructed from a configuration.

10. The method of claim 9, wherein the configuration includes a starting position or a bit width.

11. The method of claim 8, wherein the mapping is stored at a ternary content-addressable memory; and wherein identifying the address of the service node is performed by looking up the fragment in the ternary content-addressable memory.

12. The method of claim 8, wherein the specific number of bits are in any octet of the source address or spanning more than one octet of the source address.

13. The method of claim 8, wherein the bitmask is an AND mask.

14. The method of claim 8, further comprising shifting the bitmask a number of bits to yield the specific number of bits in the fragment spanning one or more octets of the source address.

15. One or more non-transitory tangible computer-readable mediums storing instructions, which when executed by at least one processor of a switch, causes the at least one processor to:

receive an incoming network packet;

identify whether to load balance the incoming network packet across a plurality of service nodes;

in response to identifying whether to load balance the incoming network packet, mask, by a bitmask, a portion of a source address or a destination address of the incoming network packet to expose a fragment of the source address or the destination address, respectively;

adjust the bitmask to select a specific number of bits of the source address to be masked; and assign the incoming network packet to a service node of the plurality of service nodes by identifying an address of the service node from the fragment of the source address or the destination address based on a mapping of fragments of source addresses or destination addresses to addresses of traffic buckets of the plurality of service nodes.

16. The one or more non-transitory tangible computer-readable mediums of claim 15, wherein the bitmask is constructed from a configuration.

17. The one or more non-transitory tangible computer-readable mediums of claim 16, wherein the configuration includes a starting position or a bit width.

18. The one or more non-transitory tangible computer-readable mediums of claim 15, wherein the mapping is stored at a ternary content-addressable memory; and wherein identifying the address of the service node is performed by looking up the fragment in the ternary content-addressable memory.

19. The one or more non-transitory tangible computer-readable mediums of claim 15, wherein the specific number of bits are in any octet of the source address or spanning more than one octet of the source address.

20. The one or more non-transitory tangible computer-readable mediums of claim 15, wherein the bitmask is an AND mask.

* * * * *